United States Patent [19]

Goffe

[11] Patent Number: 4,493,629

[45] Date of Patent: Jan. 15, 1985

[54] MODULAR SPINNERETTE ASSEMBLY

[75] Inventor: Randal A. Goffe, St. Louis County, Mo.

[73] Assignee: Monsanto Company, St. Louis, Mo.

[21] Appl. No.: 565,264

[22] Filed: Dec. 27, 1983

[51] Int. Cl.³ .................. B29F 3/04; B29D 23/04; B29D 23/06

[52] U.S. Cl. .................. 425/192 S; 425/378 S; 425/463

[58] Field of Search ........... 425/192 S, 192 R, 461, 425/462, 463, 464, 467, 378 R, 378 S

[56] References Cited

U.S. PATENT DOCUMENTS

| | | | |
|---|---|---|---|
| 1,541,528 | 6/1925 | Royle | 425/467 |
| 2,574,555 | 11/1951 | Galloway | 425/192 R |
| 3,121,254 | 2/1964 | Heynen et al. | 425/464 |
| 3,321,803 | 5/1967 | Corbett | 425/192 R |
| 3,357,051 | 12/1967 | Zolotarevsky | 425/192 R |
| 3,690,806 | 9/1972 | Kovacs | 425/467 |
| 3,716,317 | 2/1972 | Williams et al. | 425/463 |
| 4,370,114 | 1/1983 | Okamoto et al. | 425/463 |

FOREIGN PATENT DOCUMENTS

| | | | |
|---|---|---|---|
| 1279888 | 10/1958 | Fed. Rep. of Germany. | |
| 2324599 | 12/1974 | Fed. Rep. of Germany | 425/464 |
| 929430 | 6/1963 | United Kingdom. | |

Primary Examiner—Willard E. Hoag
Attorney, Agent, or Firm—R. L. Broad

[57] ABSTRACT

A modular spinnerette assembly for forming hollow fibers wherein a spinnerette plate having a central bore is positioned in stacked alignment with a cylindrical member having an enlarged central opening and an annular plate, with a tube extending radially through one side of the annular plate and terminating in the bore in the spinnerette plate for cooperating with this bore to form a hollow fiber when a spinning solution is passed through the apparatus. The assembly is provided with means for centering the tube in the central bore in the spinnerette plate.

7 Claims, 5 Drawing Figures

MODULAR SPINNERETTE ASSEMBLY

BACKGROUND OF THE INVENTION

1. Field of the Invention

This invention relates to spinnerette assemblies for forming hollow fibers.

2. Prior Art

Spinnerettes for spinning hollow fibers are known. These spinnerettes usually use a pin or tube positioned in a spinning orifice for forming the hollow fiber. Usually, a tube is used for this purpose and a liquid is injected from the tube into the bore of the fiber being formed to maintain the shape of the fiber until the polymeric material making up the fiber is coagulated or solidified.

One of the primary disadvantages of known spinnerettes which are adapted to form hollow fibers is that they are very difficult to disassemble and clean and it is very easy to damage the parts making up the spinnerette when the spinnerette is taken apart for cleaning.

Most spinnerettes of this type are made largely by hand, one at a time. As a result, parts made for one spinnerette will not always fit another spinnerette. When parts are not interchangeable any damage to one part of the spinnnerette assembly may render the entire assembly useless.

In cleaning conventional hollow fiber spinnerettes it is very easy to slightly bend the liquid injection tube, such that it is off-center of the spinning orifice. When this happens, the spinnerette cannot be used again.

SUMMARY OF THE INVENTION

A modular spinnerette assembly for forming hollow fibers wherein a spinnerette plate having a central bore is held in stacked alignment with a cylindrical body member having an opening therethrough and an annular plate element having a radial bore through one side thereof. A tube extends from the radial bore in the plate element and terminates in the central bore in the spinnerette plate for cooperating with this bore to form a hollow fiber when a spinning solution is passed through the spinnerette assembly. The body member is provided with means for centering the tube in the bore in the spinnerette plate.

DETAILED DESCRIPTION OF THE INVENTION

Figure 1:
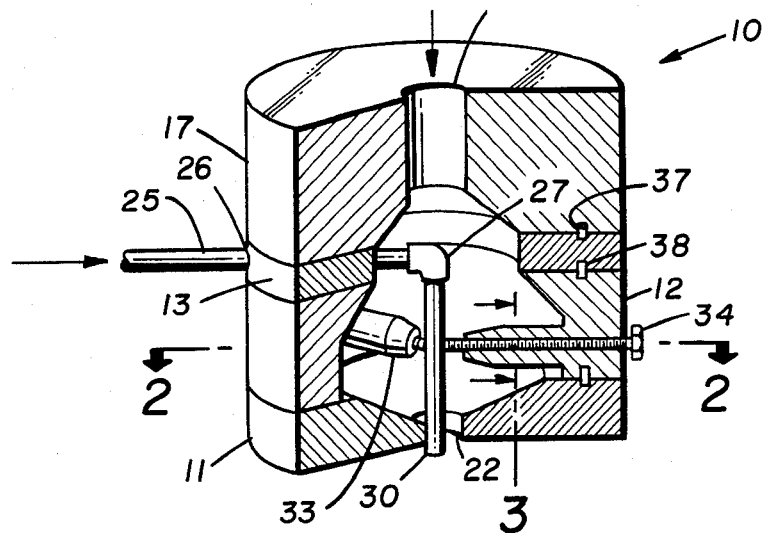
FIG. 1 is a perspective view of the spinnerette assembly of this invention with a portion cut away to show the internal construction of the spinnerette assembly.
Figure 2:
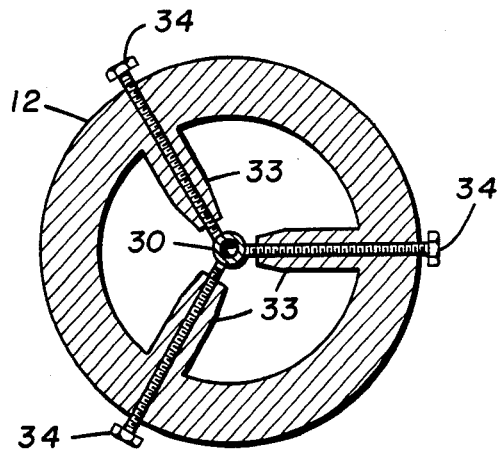
FIG. 2 is a cross-sectional view of the spinnerette assembly taken on line 2—2 of FIG. 1.

Referring now in detail to the drawings, there is shown a modular spinnerette assembly 10 made up of a spinnerette plate 11, a body member 12, and a plate element 13 in the form of a flat annulus having a central bore 60. A manifold 17 positioned in a stacked relationship on the plate element 13 is provided with the central opening 18 through which a solution of a polymeric material may be introduced into the spinnerette assembly 10.

The body member 12 is provided with a central opening 21 extending therethrough, this opening serving as a reservoir and passageway for the polymeric spinning solution. The spinnerette plate 11 is provided with a central bore 22 which forms a fiber as the polymeric spinning solution passes through this bore.

A first tube 25 extends through a radial bore 26 (FIG. 4) in the plate element 13 and terminates in an elbow 27. A second tube 30 extends from the elbow 27 and terminates in the bore 22 in the spinnerette plate 11. The purpose of the tube 30 is to cooperate with the bore 22 to form the hollow fiber, a fluid being injected through the tube 30 into the bore of the hollow fiber as it is being formed.

Figure 3:
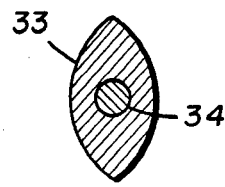
FIG. 3 is a cross-sectional view taken on line 3—3 of FIG. 1.

The body element 12 is provided with a plurality of spokes 33 having the radial positioning shown in FIG. 3 and threaded openings extending radially from the tube 30. Screws 34 threaded through the spokes 33 serve to center the tube 30 in the bore 22. The spinnerette plate, the body member 12, the plate element 13 and the manifold 17 are each provided with alignment bores 37 in which are positioned pins 38 for holding the parts of the spinnerette assembly in a stacked alignment. The stacked parts 11, 12, 13 and 17 are held tightly together by bolts (not shown) which extend longitudinally through the stack.

If it is desired to use a more rebust structure than the pins 38 for holding the parts 11, 12, 13 and 17 in stacked alignment, these parts can be provided with mating annular lands and grooves (not shown). An annular land on the upper surface of the spinnerette plate 11, for example, would fit into an annular groove on the lower face of the body member 12.

In operation, a spinning solution of a known type is passed into the bore 18 and through the spinnerette assembly, exiting therefrom through the bore 22 in the form of a hollow fiber. This spinnerette may be easily disassembled for cleaning and just as easily reassembled after cleaning. There is little danger of any damage to any of the parts of the spinnerette assembly during disassembly, cleaning or reassembly.

Figure 4:
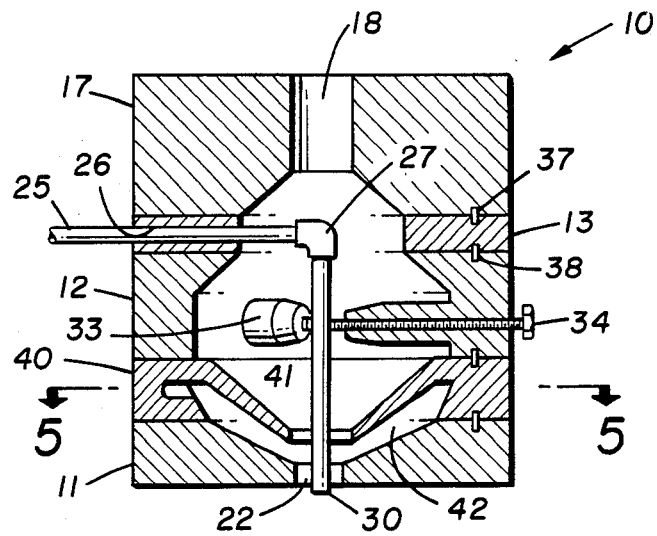
FIG. 4 is a cross-sectional view of another embodiment of the invention which is capable of forming hollow fiber membranes from two polymeric solutions.
Figure 5:
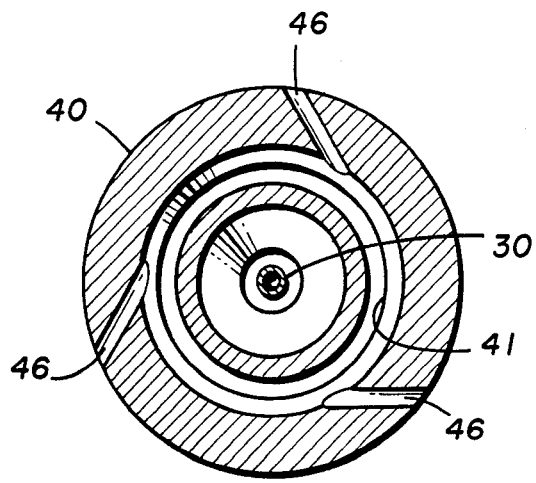
FIG. 5 is a cross-sectional view taken on line 5-5 of FIG. 4.

FIGS. 4 and 5 show a second embodiment of the spinnerette assembly which can be used to form hollow fibers from two spinning solutions. This embodiment uses the apparatus described above with the addition of an annular spacer 40 positioned between the spinnerette plate 11 and the body member 12. The spacer 40 is provided with an annular flange 41 which cooperates with the spinnerette plate 11 to form an annular cavity 42 into which a second polymeric spinning solution is admitted through a plurality of ports or openings 46 tangentially positioned with respect to the cavity 42. By using this embodiment of the invention, a hollow fiber having discrete, concentric layers of two different polymeric materials can be formed.

I claim:

1. A modular spinnerette assembly for forming hollow fibers, comprising (a) a spinnerette plate having a central bore for spinning a fiber from a solution of a polymeric material;

(b) a body member having an enlarged central opening for serving as a reservoir and passageway for said solution, said body member being stacked on the spinnerette plate;

(c) a plate element stacked on the boby member and having a central opening for the passage of said solution and also having a radial bore through one side thereof for the passage of a fluid;

(d) a tube leading from the bore in the plate element and terminating in the central bore in the spinnerette plate for injecting a fluid into the bore of the hollow fiber, said member being provided with means for centering the tube in the central bore in the spinnerette plate, said tube and said central bore cooperating to form a hollow fiber; and (e) means for holding the spinnerette plate, the body member and the plate element in stacked alignment said assembly having at least one passage, for carrying fluid, which tangentially enters a cavity portion of said assembly.

2. The spinnerette assembly of claim 1 wherein the centering means is a plurality of screws which are threaded through the body member into contact with the tube.

3. The spinnerette assembly of claim 2 wherein the body member is provided with a plurality of spokes extending regularly inward into the enlarged opening toward the tube, said screws being threaded through said spokes.

4. The spinnerette assembly of claim 3 wherein the spokes have a generally elliptical cross-sectional configuration.

5. The spinnerette assembly of claim 3 wherein the spinnerette is provided with an annular spacer positioned between the spinnerette plate and the body member, said spacer having an annular flange spaced from and concentric with the spinnerette plate, said annular flange cooperating with the spinnerette plate to form an annular cavity, said spacer also having an opening for admitting a solution of a second polymeric material into said cavity.

6. The spinnerette assembly of claim 5 wherein the opening is tangential to said cavity.

7. A modular spinnerette assembly for forming hollow fibers, comprising (a) a spinnerette plate having a central bore for spinning a fiber from a solution of a polymeric material;

(b) a body member having an enlarged axial opening extending therethrough for serving as a reservoir and passageway for said solution, said member being stacked on the spinnerette plate;

(c) an annular plate element stacked on the body member and having a radial bore through one side thereof for the passage of a fluid;

(d) a tube leading from the bore in the plate element and terminating in the central bore in the spinnerette plate, said tube and said central bore cooperating to form a hollow fiber, said body member having a plurality of spokes extending radially into the enlarged axial opening said spokes having an elliptical cross-sectional configuration;

(e) a plurality of screws threaded through the spokes for engaging and centering the tube in the central bore in the spinnerette plate, said plate element body member and spinnerette plate each being provided with a plurality of alignment bores;

(f) a manifold stacked on the plate element and having a central opening for passing said solution into said spinnerette assembly; and (g) a plurality of pins positioned in the alignment bores for holding the placement, body member and spinnerettte plate in stacked alignment said assembly having at least one passage, for carrying fluid, tangentially entering a cavity portion of said assembly.

* * * * *